US012632427B2

(12) United States Patent
Engelhart et al.

(10) Patent No.: US 12,632,427 B2
(45) Date of Patent: May 19, 2026

(54) SYSTEM AND METHOD FOR AUTOMATIC CLEAN-UP OF REDUNDANT KEY-VALUE PAIRS IN A DATABASE

(71) Applicant: Honeywell International Inc., Charlotte, NC (US)

(72) Inventors: Adam Engelhart, Bruchin (IL); Paz Fichman, Tel Aviv (IL); Alexey (Eli) Khitrov, Tel Aviv (IL); Niv Peled, Even Yehuda (IL)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/942,804

(22) Filed: Nov. 11, 2024

(65) Prior Publication Data

US 2026/0133945 A1     May 14, 2026

(51) Int. Cl.
  *G06F 16/00*      (2019.01)
  *G06F 16/215*     (2019.01)
(52) U.S. Cl.
  CPC ................................. *G06F 16/215* (2019.01)
(58) Field of Classification Search
  USPC ....................................................... 707/692
  See application file for complete search history.

(56) References Cited

U.S. PATENT DOCUMENTS 8,250,008 B1 * 8/2012 Cao ........................ G06Q 30/02
                                                706/14

OTHER PUBLICATIONS

Li et al. (CN-113159155-A), "Mixed Attribute Data Processing Method, Medium And Device For Recriminal Risk Pre-warning", Jul. 23, 2021, 18 Pages. (Year: 2021).*
Feng et al. (CN-110377747-A), "A Knowledge Base Fusion Method Of Encyclopedia-oriented Website", Oct. 25, 2019, 13 Pages. (Year: 2019).*
Wang et al. (CN-118585656-A), "A Network Security Oriented Knowledge Base Construction Method", Sep. 3, 2024, 27 Pages. (Year: 2024).*

* cited by examiner

*Primary Examiner* — Bai D Vu

(74) *Attorney, Agent, or Firm* — Alston & Bird LLP

(57)          ABSTRACT

A system and method for automatic clean-up of redundant key-value pairs in a database is provided. The present disclosure comprises detecting a new key-value pair comprising a renamed key field or a new key field and a value field, in the database; identifying at least one redundant key-value pair in the plurality of key-value pairs of the database based on determining a similarity between the value field of the new key-value pair and a value field of at least one key-value pair in the plurality of key-value pairs; verifying whether one or more conditions are set for the at least one redundant key-value pair; and performing deletion of the identified at least one redundant key-value pair from the database, upon verification of the one or more conditions.

20 Claims, 9 Drawing Sheets

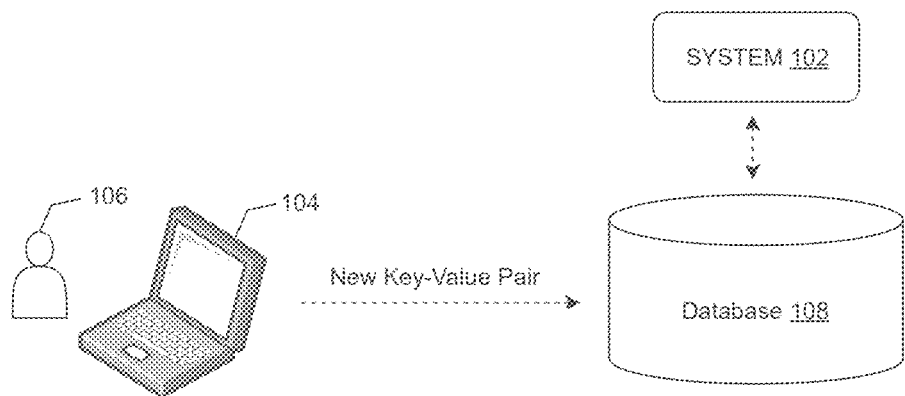
FIG. 1

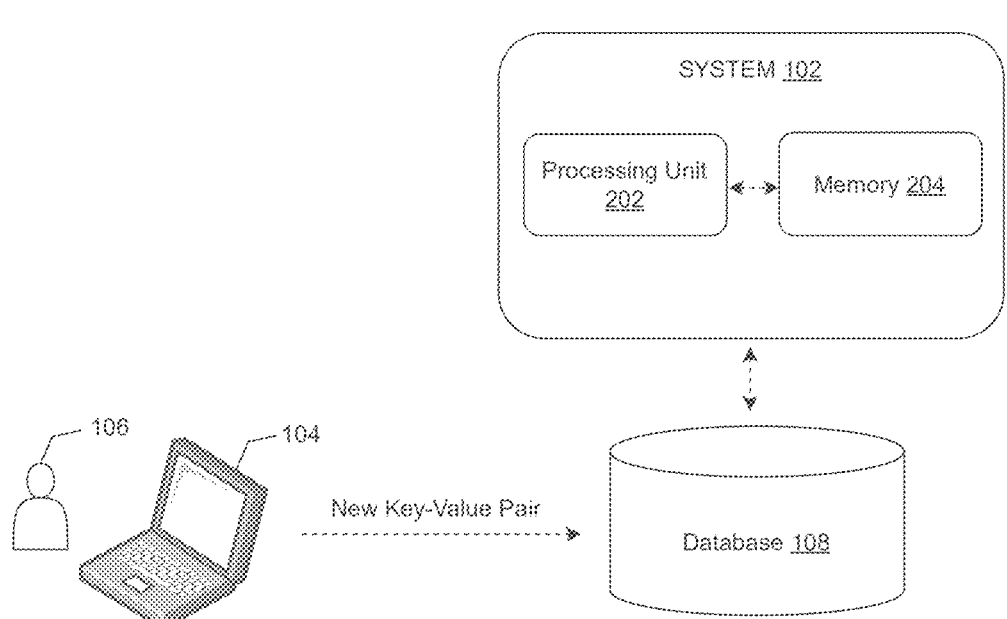
FIG. 2

300-1 —↘

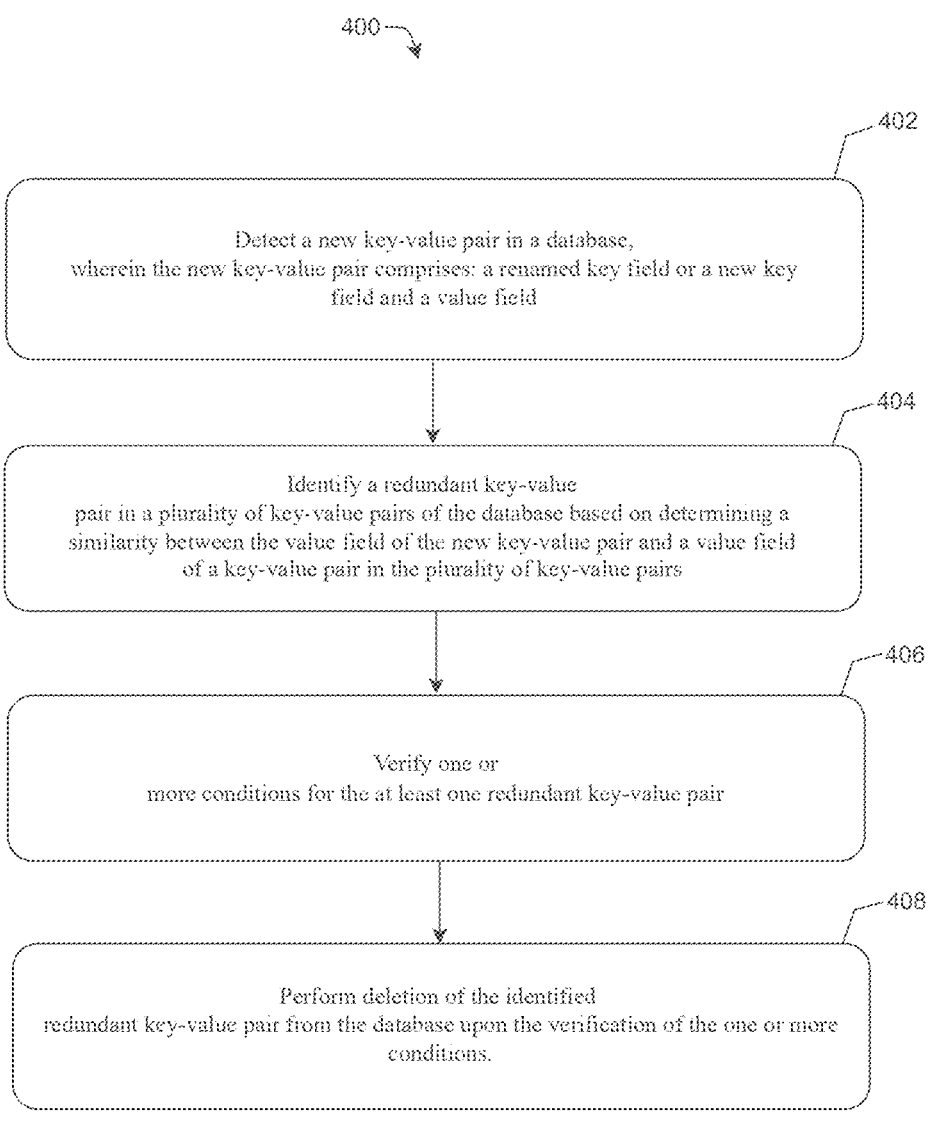

400

402

Detect a new key-value pair in a database,
wherein the new key-value pair comprises: a renamed key field or a new key
field and a value field

404

Identify a redundant key-value
pair in a plurality of key-value pairs of the database based on determining a
similarity between the value field of the new key-value pair and a value field
of a key-value pair in the plurality of key-value pairs

406

Verify one or
more conditions for the at least one redundant key-value pair

408

Perform deletion of the identified
redundant key-value pair from the database upon the verification of the one or more
conditions.

Scan a database to identify a value
field of a key-value pair in a plurality of key-value pairs which
is identical or matching with a value field of a new key-value pair

504

Deem the identified key-value
pair as a redundant key-value pair

700 —

702

Determine whether a redundant
key-value pair has a deletion operation scheduled or not, wherein the deletion
operation defines a time at which the at least one redundant key-value pair is
to be deleted

704

Flag the redundant key-value
pair for deletion as per the deletion operation schedule

SYSTEM AND METHOD FOR AUTOMATIC CLEAN-UP OF REDUNDANT KEY-VALUE PAIRS IN A DATABASE

TECHNICAL FIELD OF THE INVENTION

The present subject matter relates to database management technique, and, more particularly, to automatic clean-up of a database.

BACKGROUND OF THE INVENTION

Key-value based databases contain plurality of key-value pairs stored in various types of data structures, tables being most popular ones. A key-value pair is two linked data items: a key, which is a unique identifier for some item of data, and the value, which is either the data that is identified or a pointer to the location of that data. These databases are frequently manipulated by users, administrators, etc., for example, addition, deletion, and modification of key-values pairs. These manipulations may sometimes cause redundancy of key-value pairs in these databases. These redundant key-value pairs not only occupy storage which may otherwise be used for storing other relevant data, they may sometimes also create inefficiency for those programs or systems that are accessing data from these databases. In some instances, presence of redundant key-value pairs may lead to a dangerous or risky situation where a system performance gets compromised due to redundancy in the database. For example, a database storing data of a power grid or a nuclear power plant or any other critical facility.

Existing database management systems struggle while managing databases storing data in key-value pair format. Especially, when these databases are frequently manipulated from multiple sources. For instance, the existing database management systems often prove to be inefficient when the keys in key-value pairs are renamed by software designers/engineers/database administrators, etc., for any reason.

Moreover, the existing database management systems while performing database clean up are prone to risking data loss and they may sometimes jeopardize the efficiency of those systems which are accessing such databases. Also, the existing database management systems fail to ensure safe removal of redundant data.

Thus, there exists a technical challenge to provide a solution to address the shortcomings related to the existing techniques of database management.

SUMMARY OF THE INVENTION

The present subject matter discloses a system and method for automatic clean-up of redundant key-value pairs in a database.

In an embodiment, a method for automatic clean-up of redundant key-value pairs in a database comprising a plurality of key-value pairs is disclosed. The method comprises detecting a new key-value pair in the database. The new key-value pair comprises: a renamed key field or a new key field and a value field. Further, the detecting of the new key-value pair is performed in at least one of: (a) real time; or (b) a periodic scan of the database. The method further comprises identifying at least one redundant key-value pair in the plurality of key-value pairs of the database based on determining a similarity between the value field of the new key-value pair and a value field of at least one key-value pair in the plurality of key-value pairs. The method further comprises verifying whether one or more conditions are set for the at least one redundant key-value pair, wherein the one or more conditions comprise at least one of: (a) at least one association of the at least one redundant key-value pair with at least one ongoing process, and (b) a deletion operation schedule for the at least one redundant key-value pair. The method further comprises performing deletion of the identified at least one redundant key-value pair from the database, upon verification of the one or more conditions.

In some embodiments, the identifying of the at least one redundant key-value pair, comprises scanning the database to identify the value field of the at least one key-value pair in the plurality of key-value pairs which is (a) identical to the value field of the new key-value pair, or (b) matching the value field of the new key-value pair by a predefined percentage, to determine that the value field of the new key-value pair and the value field of the at least one key-value pair in the plurality of key-value pairs are similar. The identifying of the at least one redundant key-value pair, further comprises deeming the identified at least one key-value pair as the at least one redundant key-value pair.

In some embodiments, the verifying the one more conditions for the at least one redundant key-value pair, comprises verifying whether the at least one redundant key-value pair is being accessed by the at least one ongoing process. The verifying the one more conditions for the at least one redundant key-value pair, further comprises flagging the at least one redundant key-value pair for deletion, when it is verified that the at least one redundant key-value pair is not being accessed by the at least one ongoing process.

In some embodiments, the verifying the one more conditions for the at least one redundant key-value pair, comprises verifying whether the at least one redundant key-value pair is being accessed by the at least one ongoing process. The verifying the one more conditions for the at least one redundant key-value pair, further comprises flagging the at least one redundant key-value pair for deletion on completion of the at least one ongoing process, when it is verified that the at least one redundant key-value pair is being accessed by the at least one ongoing process.

In some embodiments, the verifying the one more conditions for the at least one redundant key-value pair, comprises determining whether the at least one redundant key-value pair has a deletion operation scheduled or not, wherein the deletion operation schedule defines a time at which the at least one redundant key-value pair is to be deleted. The verifying the one more conditions for the at least one redundant key-value pair, further comprises flagging the at least one redundant key-value pair for deletion as per the deletion operation schedule.

In some embodiments, where the identifying comprises identifying a plurality of redundant key-value pairs in the plurality of key-value pairs in the database, the performing of the deletion, comprises performing concurrent deletion of the plurality of redundant key-value pairs.

In another embodiment, a system for automatic clean-up of redundant key-value pairs in a database comprising a plurality of key-value pairs is provided. The system comprises a memory and a processing unit coupled to the memory and the database. The processing unit is configured to detect a new key-value pair in the database. The new key-value pair comprises: a renamed key field or a new key field and a value field. The processing unit is further configured to identify at least one redundant key-value pair in the plurality of key-value pairs of the database based on determining a similarity between the value field of the new key-value pair and a value field of at least one key-value pair in the plurality of key-value pairs. The processing unit is further configured to verify whether one or more conditions are set for the at least one redundant key-value pair, wherein the one or more conditions comprise at least one of: (a) at least one association of the at least one redundant key-value pair with at least one ongoing process, and (b) a deletion operation schedule for the at least one redundant key-value pair. The processing unit is further configured to perform deletion of the identified at least one redundant key-value pair from the database, upon verification of the one or more conditions.

In yet another embodiment, a computer-readable medium having computer-executable instructions stored thereon that, when executed by a processing unit, cause the processing unit to execute a method for automatic clean-up of redundant key-value pairs in a database comprising a plurality of key-value pairs, is disclosed. The computer-executable instructions, when executed by the processing unit, cause the processing unit to detect a new key-value pair in the database. The new key-value pair comprises: a renamed key field or a new key field and a value field. Further, the computer-executable instructions cause the processing unit to identify at least one redundant key-value pair in the plurality of key-value pairs of the database based on determining a similarity between the value field of the new key-value pair and a value field of at least one key-value pair in the plurality of key-value pairs. Further, the computer-executable instructions cause the processing unit to verify whether one or more conditions are set for the at least one redundant key-value pair, wherein the one or more conditions comprise at least one of: (a) at least one association of the at least one redundant key-value pair with at least one ongoing process, and (b) a deletion operation schedule for the at least one redundant key-value pair. Further, the computer-executable instructions cause the processing unit to perform deletion of the identified at least one redundant key-value pair from the database, upon verification of the one or more conditions.

The present subject matter provides a system and method for automatic clean-up of redundant key-value pairs in a database. The proposed solution enables efficiently managing key-value pairs from multiple sources in a system, especially when the keys are renamed by software designers for any reason. The proposed solution enables the automatic clean-up of redundant key-value pairs without risking data loss. This ensures that outdated or redundant data (key-value pairs) is safely removed while maintaining data integrity and consistency.

This summary is provided to describe select concepts in a simplified form that are further described in the detailed description. This summary is not intended to identify key or essential features of the claimed subject matter, nor is it intended to be used as an aid in determining the scope of the claimed subject matter.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

BRIEF DESCRIPTION OF DRAWINGS

Embodiments of the subject matter will hereinafter be described in conjunction with the following drawing figures, wherein like numerals denote like elements, and:

FIG. 1 is a schematic diagram of an illustrative environment implementing a system for automatic clean-up of redundant key-value pairs in a database, according to one or more embodiments of the present disclosure;

FIG. 2 is a schematic diagram of an illustrative environment depicting a block diagram of the system for automatic clean-up of redundant key-value pairs in a database, according to one or more embodiments of the present disclosure;

FIG. 4 illustrates a flowchart of a method for automatic clean-up of redundant key-value pairs in a database, according to one or more embodiments of the present disclosure;

Figure 3:
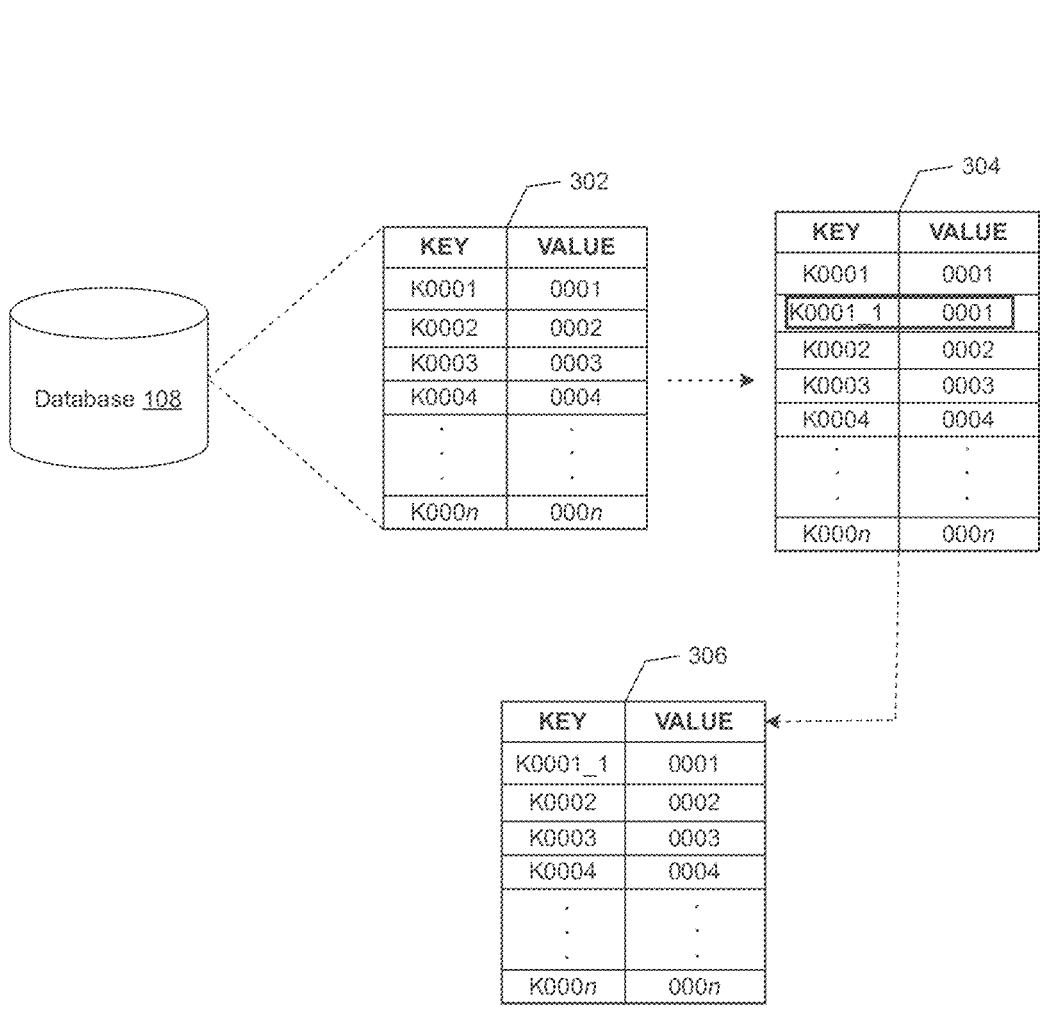
FIG. 3 illustrates a use case depicting operations of the system for the automatic clean-up of redundant key-value pairs in a database, according to one or more embodiments of the present disclosure.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION OF INVENTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic diagram of an illustrative environment 100 for automatic clean-up of redundant key-value pairs in a database 108, according to one or more embodiments of the present disclosure. The environment 100 depicts a system 102, a computing device 104, a user 106 having access to the computing device 104 and the database 108. Examples of the computing device 104 may include, but are not limited to, a laptop, a desktop computer, a server, a handheld device, a portable computing device, and any other device having computational capability. Further, the system 102 may be implemented to perform various operations on one or more data of the database 108. The database 108 may be any type of database such as a hierarchical database, network database, relational databases, centralized database, distributed database, cloud database, data warehouses or any other type of database as per the implementation requirements.

In some embodiments, the database 108 may comprise data stored in any type of data structure, for example, a table, a tree, a stack, a list or any other data structure suitable as per implementation requirement capable of storing data in the form of key-value pair. For the ease of understanding, the present invention has been explained with reference to a table containing one or more key-value pairs and the same should not be inferred as a limitation. A person of ordinary skill in the art would appreciate that any other data structure as mentioned above may be used for implementing the present invention.

In some embodiments, the database 108 may comprise one or more key-value pairs having a key field and at least one associated value field. The key field may be an ID or a name whereas the value field may be the actual content associated with the key field. In a non-limiting example, a key-value pair for 'wireless networks' standard/protocol of the Institute of Electrical and Electronics Engineers (IEEE) may be stored in the database 108 as "wireless networks" as the key field (IEEE standard name) and "802.11" as the value field (IEEE standard number), and similarly the below table (Table 1) may depict exemplary key-value pairs of various other IEEE standards names and their corresponding standard number:

TABLE 1

| Key | Value |
|---|---|
| Interworking | 802.1 |
| Logical Link | 802.2 |
| Ethernet LAN | 802.3 |
| Token Bus LAN | 802.4 |
| Token Ring LAN | 802.5 |
| . | . |
| . | . |
| . | . |
| Wireless networks | 802.11 |
| . | . |
| . | . |
| . | . |
| Wireless RAN | 802.22 |

It must be appreciated that the data related to IEEE standards in the above Table (Table 1) depicts a mere non-limiting example for the ease of understanding and must not be understood as a limitation whatsoever. The database 108 may comprise data in key-value pair format related to any other domain or field as well, for example, but not limited to, power grid sector, data centres, financial institutions, business enterprises, educational institutions, cyber security, nuclear power facility, defence sector, transport sector, labour organizations, etc.

Further, the database 108 may allow the user 106 to perform, via the computing device 104, various operations on one or more key-value pairs such as addition of one or more new key-value pairs, deletion of one or more new key-value pairs, modification of the key field and/or the value field of the existing one or more key-value pairs, etc. In an aspect, in case of modification of the existing one or more key-value pairs, the user 106 may rename a key field while keeping the value field unchanged. In another aspect, the user 106 may rename a key field and change the value field as well.

In some embodiments, the system 102 may consider addition of a completely new key-value pair as a new key-value pair. Further, the system 102 may also consider a modified key-value pair as a new key-value pair. Further, the system 102, upon detecting the new key-value pair in the database 108 may initiate performing the technique of automatic clean-up of redundant key-value pairs in the database 108. The system 102, upon performing the automatic clean-up of redundant key-value pairs in the database 108, may render the database 108 free from redundant key-value pairs while maintaining data integrity and consistency in the database 108.

Although the environment 100 depicts only one computing device i.e. the computing device 104 as introducing the new key-value pair into the database 108, it must not be understood as a limitation. Rather, in an alternate embodiment, the database 108 may be operationally connected to a plurality of computing devices that may act as a multiple source for the database 108 for receiving one or more new key-value pairs from the plurality of computing devices. In an aspect, the database 108 may receive the one or more new key-value pairs from the plurality of computing devices simultaneously. In another aspect, the database 108 may receive the one or more new key-value pairs from the plurality of computing devices at different and/or multiple instances.

In some embodiments, the database 108 and the system 102 may be located together in a system and may be coupled with each other by wired and/or wireless connection. In an alternate embodiment, the database 108 may be externally located and the system 102 may communicate with the database 108 via a wireless connection. In yet another embodiment, the database 108 may be a cloud based database and the system 102 may remotely access the database 108 via internet to perform above discussed various operations. A further detailed illustration and explanation is provided below with regard to FIG. 2.

FIG. 2 is a schematic diagram of an illustrative environment 200 depicting a block diagram of the system 102 for automatic clean-up of redundant key-value pairs in the database 108. The system 102 may comprise at least a processing unit 202 and a memory 204, communicatively coupled with each other. Although the block diagram of the system 102 depict only the processing unit 202 and the memory 204, the system 102 may comprise other components such as one or more input/output (I/O) modules, transceiver, a display unit, etc. (not shown in figure).

In some non-limiting examples, the processing unit 202 may be implemented or realized as a general purpose processor or a group of general purpose processors, a content addressable memory, a digital signal processor, an application specific integrated circuit (ASIC), a field programmable gate array, any suitable programmable logic device, discrete gate or transistor logic, discrete hardware components, or any combination designed to perform the functions described here. In some examples, the processing unit 202 may be realized as microprocessors, controllers, microcontrollers, or state machines. In some examples, the processing unit 202 may be realized as a combination of computing devices, such as, a combination of digital signal processors and microprocessors, a plurality of microprocessors, one or more microprocessors in conjunction with a digital signal processor core, or any other such combination/configuration. Furthermore, alternative software implementations including, but not limited to, distributed processing, parallel processing, or virtual machine processing can also be configured to perform the methods described herein.

Further, in some non-limiting examples, the memory 204 may be disk drives, optical storage devices, solid-state storage devices such as a random access memory ("RAM") and/or a read-only memory ("ROM"), which can be programmable, flash-updateable and/or the like. Further, other components of the system 102 such as the one or more input/output (I/O) modules, transceiver, a display unit, etc. (not shown in figures) may be similar to any computing system as understood to one skilled in the art.

In some embodiments, the user 106 via the computing device 104 may manipulate the database 108 so that the new key-value pair is available in the database 108, the processing unit 202 may consider a key-value pair in the database 108 as the new key-value pair if a completely new key-value pair has been inserted by the user 106 via the computing device 104 or the user 106 via the computing device 104 has performed modification of a key field and/or a value field of the existing one or more key-value pairs in the database 108.

As explained in the above paragraphs, while modifying an existing key-value pair of the database 108, the user 106 via the computing device 104 may rename a key field while keeping the associated value field unchanged or rename the key field and change the associated value field as well.

In one non-limiting embodiment, the processing unit 202 may perform detection of the new key-value pair in real-time i.e., as soon as the new key-value pair is introduced in the database 108, the processing unit 202 may detect the new key-value pair and initiate the further process of automatic clean-up of redundant key-value pairs in the database 108. The processing unit 202 may identify at least one redundant key-value pair in the plurality of key-value pairs of the database 108. In this regard, the processing unit 202 may determine a similarity between the value field of the new key-value pair and any other value field in the plurality of key-value pairs pre-existing in the database 108.

To determine if any other value field is similar to the value field of the new key-value field, the processing unit 202 may scan the database 108 to identify any other value field in the plurality of key-value pairs pre-existing in the database 108 which is identical to the value field of the new key-value pair. The processing unit 202 may identify any other value field as identical to the value field of the new key-value pair when the processing unit 202 is able to perfectly match the content of the value field of the new key-value pair with any other value field of the plurality of key-value pairs pre-existing in the database 108 i.e., the value field of the new key-value field has 100% match with another value field already existing in the database 108.

Further, the processing unit 202, upon identifying at least one identical value field in the plurality of key-value pairs pre-existing in the database 108, may deem the key-value pair containing the identified value field which is identical to the value field of the new key-value pair as a redundant key-value pair in view of the new key-value pair. Similarly, in some embodiments, the processing unit 202 may identify more than one identical value fields in the plurality of key-value pairs pre-existing in the database 108. In this case, the processing unit 202 may deem all such key-value pairs in the plurality of key-value pairs pre-existing in the database 108 as redundant key-value pairs.

In some example, referring to the above Table 1, if the user 106, via the computing device 104, introduces a new key-value pair as mentioned below:

| Key | Value |
| --- | --- |
| Wireless networks Legacy | 802.11 |

Thus, when this new key-value pair is added by the user 106 in the Table 1 contained in the database 108, the processing unit 202 may scan the pre-existing key-value pairs of the Table 1 and may identify the value field "802.11" associated with the pre-existing key field "wireless networks" as similar (i.e., identical in this case) with the value field of the above mentioned new key-value pair. Therefore, the processing unit 202 may deem the pre-existing key-value pair "wireless networks—802.11" as redundant key-value pair in view of the new key-value pair "Wireless networks Legacy—802.11".

In some embodiments, while scanning the database 108, the processing unit 202 may not find any value field in the pre-existing key-value pairs which is perfectly matching (i.e., identical) to the value field of the new key-value pair. In this situation, the processing unit 202 may perform identification of any value field which may be similar to the value field of the new key-value pair by a predefined percentage. The predefined percentage may be hardcoded/pre-configured by the developers or engineers or an administrator of the system 102. In an example, the predefined percentage may also be changed after the system 102 is implemented.

In an non-limiting example, the predefined percentage may be set to 90% i.e., if the processing unit 202, while scanning the database 108, identifies a value field in the pre-existing key-value pairs of the database 108 which is matching with the value field of the new key-value pair by at least 90%, the processing unit 202 may identify such a key-value pair containing the value matching or similar by at least 90% with the new key-value pair as a redundant key-value pair. Similarly, the predefined percentage may be set as 80%, 85%, 95%, 99% or any other number as per the implementation requirement. In another example, the pre-defined percentage may be set as a range, for example, 80-90%, 90-99% or any other range as per the implementation requirement.

In some example, referring to the above Table 1, if the user 106, via the computing device 104, introduces a new key-value pair as mentioned below:

| Key | Value |
| --- | --- |
| Wireless networks Legacy | 802.110 |

Here, the processing unit 202 may identify that the new value field i.e., "802.110" associated with the new key field "Wireless networks Legacy" and the value field ("802.11") associated with the pre-existing key field "wireless networks" match with each other by approximately 84%. Considering that the predefined percentage is set as 80-85%, the processing unit 202 may determine that the value field "802.11" associated with the pre-existing key field "wireless networks" are similar and may deem the key-value pair "wireless networks—802.11" as a redundant key-value pair in view of the new key-value pair "Wireless networks Legacy—802.110". Similarly, the processing unit 202 may also identify more than one redundant key-value pairs. This identification of similar value fields based on the predefined percentage may enable identification of such redundant key-value pairs that may not completely match the value field of the new key-value pair but only contain minimal differences. In the above example, the value field of the new key-value pair "Wireless networks Legacy—802.110" differs minimally from the value field of the pre-existing key-value pair "wireless networks—802.11" in that the value field of the new key-value pair ("Wireless networks Legacy—802.110") contains a "0" at the end. However, this additional "0" may represent a standard update rendering the "wireless networks—802.11" as an obsolete standard, which may not be required anymore. Thus, identification of the redundant key-value pair "wireless networks—802.11" becomes critical for an efficient management of the database 108.

In some embodiments, upon identifying at least one redundant key-value pair in the plurality of key-value pairs of the database 108, the processing unit 202 may verify whether one or more conditions are set for the at least one redundant key-value pair, before performing deletion of the identified at least one redundant key-value pair from the database 108. In an aspect, the one or more conditions comprise at least one of: (a) at least one association of the at least one redundant key-value pair with at least one ongoing process, and (b) a deletion operation schedule for the at least one redundant key-value pair.

In some embodiments, to perform verification whether there is at least one association of the at least one redundant key-value pair with the at least one ongoing process, the processing unit 202 may verify whether the at least one redundant key-value pair is currently being accessed by at least one ongoing process. In a non-limiting example, an ongoing process may be any execution of program or code which may be accessing data associated with the identified at least one redundant key-value pair. Upon determining that the identified at least one redundant key-value pair is not being accessed by any ongoing process, the processing unit 202 may flag the at least one redundant key-value pair for deletion from the database 108. In an aspect, the flag for deletion may indicate that the at least one redundant key-value pair may be deleted now and the deletion of the at least one redundant key-value pair may not adversely affect any process i.e., it is safe to delete.

In an alternate embodiment, the processing unit 202 may determine that the identified at least one redundant key-value pair is currently being accessed by at least one ongoing process. In this case, the processing unit 202 may flag the at least one redundant key-value pair upon completion of the at least one ongoing process. This means that the at least one redundant key-value pair may only be flagged for deletion only after termination of the at least one association of the at least one redundant key-value pair with the at least one ongoing process. This will ensure safe data removal from the database 108 without jeopardizing execution of any ongoing process.

Further, the processing unit 202 may verify whether the identified at least one redundant key-value pair has a deletion operation scheduled or not. In a non-limiting aspect, the deletion operation schedule may define a time at which the identified at least one redundant key-value pair is to be deleted. Determining the presence of the deletion operation schedule for the identified at least one redundant key-value pair may be performed to ensure safe data removal. In an example embodiment, in a scenario where an ongoing process is currently accessing the identified at least one redundant key-value pair and the ongoing process is scheduled to continue for a predetermined or known period, the processing unit 202 may set a status of the identified at least one redundant key-value pair as 'deletion operation scheduled'. Further, the processing unit 202 may determine the predetermined or known period for which the ongoing process is set to continue. Further, the processing unit 202 may flag the identified at least one redundant key-value pair for deletion as per the deletion operation schedule i.e., after the predetermined or known period for which the ongoing process is set to continue is over.

In some embodiments, the processing unit 202 may determine the presence of the deletion operation schedule for the identified at least one redundant key-value pair to handle a scenario where a process is set to access the identified at least one redundant key-value pair in due course and the process is scheduled to continue for a predetermined or known period. In this scenario, the processing unit 202 may set the status of the identified at least one redundant key-value pair as deletion operation scheduled.

Finally, the processing unit 202 may perform deletion of the identified at least one redundant key-value pair upon verification of the one or more conditions as explained above.

In some embodiments, the processing unit 202 may find/identify more than one redundant key-value pairs i.e., a plurality of redundant key-value pairs in view of one or more new key-value pairs, the processing unit 202 may perform concurrent deletion of the identified plurality of redundant key-value pairs from the database 108 after verifying the one or more conditions for each of the identified redundant key-value pairs. This may provide a bulk deletion/removal of redundant key-value pairs which may enhance the speed of automatic clean-up of redundant key-value pairs in a database 108.

In some embodiments, the processing unit 202 may perform detection of the new key-value pair during a periodic scan of the database 108. The periodic scan of the database 108 may be a pre-configured process of scanning the database 108 periodically after a predefined time interval. In a non-limiting example, the periodic scan of the database 108 may be a pre-configured or scheduled after every 30 minutes, 1 hour, twice in a day, thrice in a day, etc. or at any other predefined time-interval as per the implementation requirement.

In some embodiments, the processing unit 202, while performing the periodic scan of the database 108, may detect the new key-value pair in the database 108 and may initiate the further process of automatic clean-up of redundant key-value pairs in the database 108. Upon detecting the new key-value pair during the periodic scan of the database 108, the processing unit 202 may perform identification process of at least one redundant key-value pair in the plurality of key-value pairs of the database 108. In this regard, upon detecting the new key-value pair during the periodic scan of the database 108, the processing unit 202 may determine a similarity between the value field of the new key-value pair and any other value field in the plurality of key-value pairs pre-existing in the database 108.

Now, similar to the process explained in above paragraphs regarding determination of presence of any other value field similar to the value field of the new key-value field, the processing unit 202 may scan the database 108 to identify any other value field in the plurality of key-value pairs pre-existing in the database 108 which is identical to the value field of the new key-value pair. The processing unit 202 may identify any other value field as identical to the value field of the new key-value pair when the processing unit 202 is able to perfectly match the content of the value field of the new key-value pair with any other value field of the plurality of key-value pairs pre-existing in the database 108 i.e., the value field of the new key-value field has 100% match with another value field already existing in the database 108.

Further, the processing unit 202, upon identifying at least one identical value field in the plurality of key-value pairs pre-existing in the database 108, may deem the key-value pair containing the identified value field which is identical to the value field of the new key-value pair detected during the periodic scan of the database 108 as a redundant key-value pair in view of the new key-value pair. Similarly, in some embodiments, the processing unit 202 may identify more than one identical value fields in the plurality of key-value pairs pre-existing in the database 108. In this case, the processing unit 202 may deem all such key-value pairs in the plurality of key-value pairs pre-existing in the database 108 as redundant key-value pairs in view of the new key-value pair detected during the periodic scan of the database 108.

In some embodiments, while scanning the database 108 to identify any other value field similar to the value field of the new key-value pair detected during the periodic scan of the database 108, the processing unit 202 may not find any value field in the pre-existing key-value pairs which is perfectly matching (i.e., identical) to the value field of the new key-value pair. In this situation, the processing unit 202 may perform identification of any value field which may be similar to the value field of the new key-value pair by a predefined percentage. As explained in above paragraphs related to real-time detection of the new key-value pair, the predefined percentage may be hardcoded/pre-configured by the developers or engineers or an administrator of the system 102. In a non-limiting aspect, the predefined percentage may also be changed after the system 102 is implemented.

Further, as explained in above paragraphs related to real-time detection of the new key-value pair, before performing the deletion of the identified at least one redundant key-value pair, the processing unit 202 may verify whether the one or more conditions are set for the at least one redundant key-value pair i.e., at least one of: (a) at least one association of the at least one redundant key-value pair with the at least one ongoing process, and (b) a deletion operation schedule for the at least one redundant key-value pair. Further, once the processing unit 202 verifies the one or more conditions, the processing unit 202 may perform deletion of the identified at least one redundant key-value pair as soon it determines the flag for deletion of the identified at least one redundant key-value pair.

In some embodiments, while performing periodic scan of the database 108, the processing unit 202 may identify/find more than one redundant key-value pairs i.e., a plurality of redundant key-value pairs in view of one or more new key-value pairs detected during the periodic scan of the database 108, the processing unit 202 may perform concurrent deletion of the identified plurality of redundant key-value pairs from the database 108 after verifying the one or more conditions for each of the identified redundant key-value pairs. This may provide a bulk deletion/removal of redundant key-value pairs which may enhance the speed of automatic clean-up of redundant key-value pairs in a database 108.

FIG. 3 illustrates a use case 300 depicting operations of the system 102 for the automatic clean-up of redundant key-value pairs in the database 108, according to some embodiments of the present disclosure. The use case 300 depicts the database 108 as having a table 302. The table 302 of the database 108 may comprise a plurality of key-value pairs. Each of the key-value pair of the table 302 may comprise a key field and at least one associated value field. The table 302 depicts key-value pairs such as K0001-0001, K0002-0002, K0003-0003, K0004-0004, . . . , K000n-000n merely for ease of understanding and should not be understood as a limitation whatsoever. Further, a person having ordinary skill in the art would appreciate that the table 302 may contain any number 'n' of key-value pairs as per the implementation requirement.

Although, the use case 300 depicts the database 108 comprising only one table i.e., table 302, it must be seen as a limitation and a person having ordinary skill in the art would appreciate that the database 108 may comprise any number of tables along with any other data structure as mentioned in above paragraphs.

In the use case 300, the user 106 has introduced a new key-value pair "K0001_1-0001" in the table 302 which contains a renamed key field and an unchanged value field compared to the pre-existing key-value pair "K0001-0001". The user case 300 depicts the addition of the new key-value pair "K0001_1-0001" in a table 304 i.e., the table 304 represents the plurality of key-value pairs pre-existing in the table 302 i.e., K0001-0001, K0002-0002, K0003-0003, K0004-0004, . . . , K000n-000n, along with the new key-value pair i.e., "K0001_1-0001". Therefore, the table 304 contains K0001-0001, K0001_1-0001, K0002-0002, K0003-0003, K0004-0004, . . . , K000n-000n.

In some embodiments, the processing unit 202 may perform detection of the new key-value pair "K0001_1-0001" in real-time i.e., as soon as the new key-value pair is introduced in the database 108 and initiate the further process of automatic clean-up of redundant key-value pairs in the database 108. In some other embodiments, the processing unit 202 may perform detection of the new key-value pair "K0001_1-0001" during a periodic scan of the database 108. Further, the processing unit 202 may perform identification of at least one redundant key-value pair in the plurality of key-value pairs i.e., in the key-value pairs which were present in the table 302. It must be appreciated that the tables 302 and 304 are not separate tables, and the table 304 should be understood as a transition of the table 302 after the new key-value pair "K0001_1-0001" is introduced by the user 106.

Further, to identify the at least one redundant key-value pair in view of the new key-value pair "K0001_1-0001", the processing unit 202 may determine a similarity between the value field "0001" of the new key-value pair "K0001_1-0001" and any other value field in the plurality of key-value pairs of the table 302. To determine if any other value field is similar to the value field "0001" of the new key-value field "K0001_1-0001", the processing unit 202 may scan the table 302 of the database 108 to identify any other value field in the plurality of key-value pairs pre-existing in the table 302 of the database 108 which is identical to the value field "0001" of the new key-value pair "K0001_1-0001". The processing unit 202 may identify any other value field as identical to the value field "0001" of the new key-value pair "K0001_1-0001" when the processing unit 202 is able to perfectly match the content of the value field "0001" of the new key-value pair "K0001_1-0001" with any other value field of the plurality of key-value pairs pre-existing in the table 302 of the database 108 i.e., the value field of the new key-value field has 100% match with another value field already existing in the database 108.

Now, the processing unit 202 may identify another value field "0001" associated with the key field "K0001" in the plurality of key-value pairs pre-existing in the table 302 of the database 108, upon identifying the key-value pair "K0001-0001" having identical value field as the new key-value pair "K0001_1-0001". The processing unit 202 may deem the key-value pair "K0001-0001" as a redundant key-value pair in view of the new key-value pair "K0001_1-0001".

Further, upon identifying the redundant key-value pair "K0001-0001", the processing unit 202 may perform deletion of the identified redundant key-value pair. For deletion of the identified redundant key-value pair "K0001-0001", the processing unit 202 may firstly perform verification of specific conditions before deletion/removal of the identified redundant key-value pair "K0001-0001".

In some embodiments, to perform verification of specific conditions before deletion/removal of the identified redundant key-value pair "K0001-0001", the processing unit 202 may verify whether the redundant key-value pair "K0001-0001" is currently being accessed by any ongoing process. Upon determining that the identified redundant key-value pair "K0001-0001" is not being accessed by any ongoing process, the processing unit 202 may perform deletion of the identified redundant key-value pair "K0001-0001".

In an alternated embodiment, the processing unit 202 may determine that the identified redundant key-value pair "K0001-0001" is currently being accessed by at least one ongoing process. In this case, the processing unit 202 may perform deletion of the identified redundant key-value pair "K0001-0001" on completion of the at least one ongoing process. This may ensure that the identified redundant key-value pair "K0001-0001" is safely removed from the database 108 without jeopardizing execution of any ongoing process. The use case 300 depicts a transition of the table 304 into a table 306 representing a cleaned database 108 which is free from any redundant key-value pair.

In some embodiments, before performing the deletion of the identified redundant key-value pair "K0001-0001", the processing unit 202 may determine whether the identified redundant key-value pair "K0001-0001" has a deletion operation scheduled or not. In a non-limiting aspect, the deletion operation may define a time at which the identified redundant key-value pair "K0001-0001" is to be deleted. Determining the presence of the deletion operation schedule for the identified redundant key-value pair "K0001-0001" may be performed to ensure safe data removal. In an example embodiment, in a scenario where an ongoing process is currently accessing the identified redundant key-value pair "K0001-0001" and the ongoing process is scheduled to continue for a predetermined or known period, the processing unit 202 may set a status of the identified redundant key-value pair "K0001-0001" as 'deletion operation scheduled'. Further, the processing unit 202 may determine the predetermined or known period for which the ongoing process is set to continue. Further, the processing unit 202 may perform deletion of the identified redundant key-value pair "K0001-0001" as per the deletion operation schedule i.e., after the predetermined or known period for which the ongoing process is set to continue is over.

In some embodiments, the processing unit 202 may determine the presence of the deletion operation schedule for the identified redundant key-value pair "K0001-0001" to handle a scenario where a process is set to access the identified redundant key-value pair "K0001-0001" in due course and the process is scheduled to continue for a predetermined or known period. In this scenario, the processing unit 202 may set the status of the identified redundant key-value pair "K0001-0001" as deletion operation scheduled. Further, the processing unit 202 may perform deletion of the identified redundant key-value pair "K0001-0001" as per the deletion operation schedule i.e., after the predetermined or known period for which the ongoing process is set to continue is over. In some embodiments, when the processing unit 202 determines that the identified redundant key-value pair "K0001-0001" does not have a deletion operation scheduled, the processing unit 202 may directly perform deletion of the identified redundant key-value pair "K0001-0001".

Figure 3A:
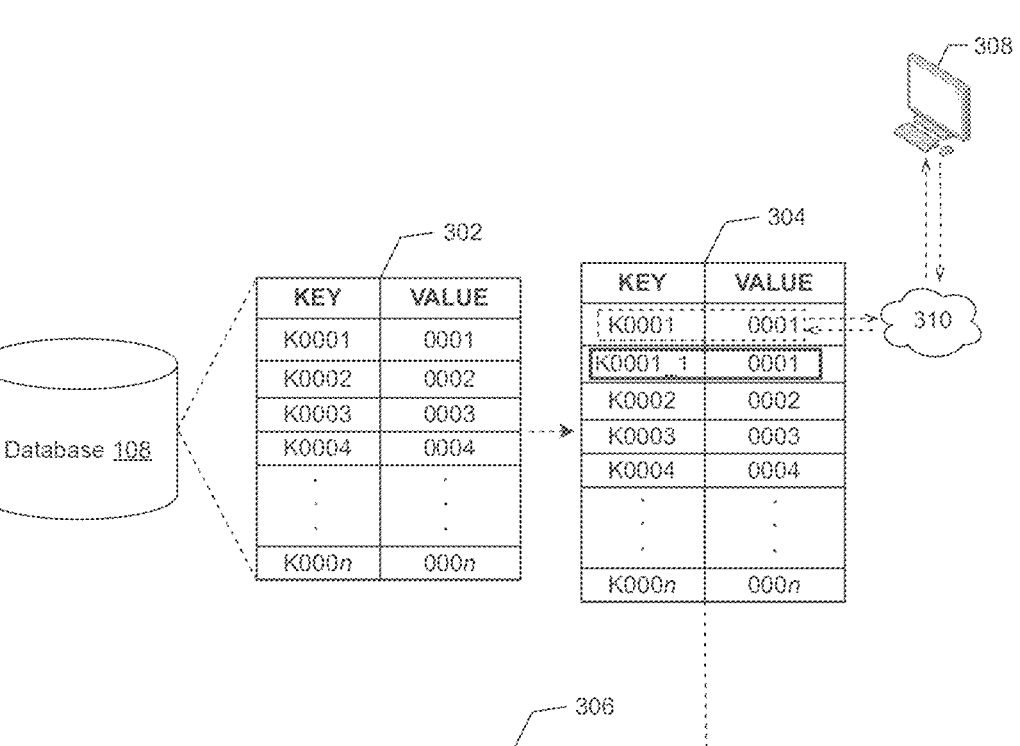
FIG. 3A illustrates another use case depicting operations of the system for the automatic clean-up of redundant key-value pair in a database, according to one or more embodiments of the present disclosure.

FIG. 3A illustrates another use case 300-1 depicting operations of the system 102 for the automatic clean-up of redundant key-value pair in the database 108, according to one or more embodiments of the present disclosure. The use case 300-1 depicts the database 108 as comprising the table 302 and transition of the table 302 into the table 304 and further into the table 306. According to the use case 300-1, a computer system 308 is operatively connected to the database 108 and accessing data from the table 304 over a network 310. In some non-limiting examples, the network 310 may include any type of wired and/or wireless communication channels to connect the database 108 and the computer system 308.

As explained in above paragraphs with respect to the use case 300, the table 302 of the database 108 may comprise a plurality of key-value pairs. Each of the key-value pairs of the table 302 may comprise a key field and at least one associated value field. The table 302 depicts key-value pairs such as K0001-0001, K0002-0002, K0003-0003, K0004-0004, . . . , K000n-000n merely for ease of understanding and should not be understood as a limitation whatsoever. Further, a person having ordinary skill in the art would appreciate that the table 302 may contain any number 'n' of key-value pairs as per the implementation requirement.

Although, the use case 300-1 depicts the database 108 comprising only one table i.e., table 302, it must not be seen as a limitation and a person having ordinary skill in the art would appreciate that the database 108 may comprise any number of tables along with any other data structure as mentioned in above paragraphs. In the use case 300-1, the user 106 has introduced a new key-value pair "K0001_1-0001" in the table 302, which contains a renamed key field and an unchanged value field compared to the pre-existing key-value pair "K0001-0001". The user case 300-1 depicts the addition of the new key-value pair "K0001_1-0001" in the table 304 i.e., the table 304 represents the plurality of key-value pairs pre-existing in the table 302 i.e., K0001-0001, K0002-0002, K0003-0003, K0004-0004, . . . , K000n-000n, along with the new key-value pair i.e., "K0001_1-0001".

In some embodiments, the processing unit 202 may perform detection of the new key-value pair "K0001_1-0001" in real-time i.e., as soon as the new key-value pair is introduced in the database 108 and initiate the further process of automatic clean-up of redundant key-value pairs in the database 108. In some other embodiments, the processing unit 202 may perform detection of the new key-value pair "K0001_1-0001" during a periodic scan of the database 108. Further, the processing unit 202 may perform identification of at least one redundant key-value pair in the plurality of key-value pairs i.e., in the key-value pairs which were present in the table 302. It must be appreciated that the tables 302 and 304 are not separate tables, and the table 304 should be understood as a transition of the table 302 after the new key-value pair "K0001_1-0001" is introduced by the user 106.

Further, to identify the at least one redundant key-value pair in view of the new key-value pair "K0001_1-0001", the processing unit 202 may firstly determine a similarity between the value field "0001" of the new key-value pair "K0001_1-0001" and any other value field in the plurality of key-value pairs of the table 304. To determine if any other value field is similar to the value field "0001" of the new key-value field "K0001_1-0001", the processing unit 202 may scan the table 304 of the database 108 to identify any other value field in the plurality of key-value pairs pre-existing in the table 304 of the database 108 which is identical to the value field "0001" of the new key-value pair "K0001_1-0001". The processing unit 202 may identify any other value field as identical to the value field "0001" of the new key-value pair "K0001_1-0001" when the processing unit 202 is able to perfectly match the content of the value field "0001" of the new key-value pair "K0001_1-0001" with any other value field of the plurality of key-value pairs pre-existing in the table 304 of the database 108 i.e., the value field of the new key-value field has 100% match with another value field already existing in the database 108.

Now, the processing unit 202 may determine that the another value field "0001" of the pre-existing key-value pair "K0001-0001" in the table 304 is identical to the value field of the new key-value pair "K0001_1-0001". Further, the processing unit 202 may deem the key-value pair "K0001-0001" as a redundant key-value pair in view of the new key-value pair "K0001_1-0001". Further, upon identifying the redundant key-value pair "K0001-0001", the processing unit 202 may verify whether one or more conditions are set for the at least one redundant key-value pair i.e., the key-value pair "K0001-0001". In a non-limiting aspect, the one or more conditions may comprise at least one of: (a) at least one association of the at least one redundant key-value pair with at least one ongoing process, and (b) a deletion operation schedule for the at least one redundant key-value pair.

In some embodiments, the processing unit 202 may firstly verify whether the redundant key-pair "K0001-0001" has at least one association with at least one ongoing process executed by the computer system 308. As depicted in the use case 300-1, the processing unit 202 may determine that the redundant key-value pair "K0001-0001" is being accessed by the computer system 308 over the network 310, hence, there exists at least one association between the redundant key-value pair "K0001-0001" and the at least one ongoing process being executed by the computer system 308. However, as depicted in the use case 300-1, the processing unit 202 may determine that the redundant key-pair "K0001-0001" does not have any deletion operation schedule.

Once the processing unit 202 verifies presence of the at least one association between the redundant key-value pair "K0001-0001" and the at least one ongoing process being executed by the computer system 308, the processing unit 202 may refrain from deleting the redundant key-value pair "K0001-0001" until the at least one association between "K0001-0001" ends i.e., completion of the at least one ongoing process. In an aspect, the completion of the at least one ongoing process may be understood as completion of a session during which the redundant key-value pair is being accessed and may not necessarily require completion of the whole process itself.

Further, once the processing unit 202 determines that at least one association between the redundant key-value pair "K0001-0001" has ended, the processing unit 202 may flag the redundant key-value pair for deletion. In an aspect, the flagging of the redundant key-value pair for deletion may indicate that the redundant key-value pair may now be removed/deleted from the database 108 without any adverse impact on the at least one ongoing process. Finally, the processing unit 202 may perform deletion of the redundant key-value pair "K0001-0001" from the database 108. The table 306 of the use case 300-1 depicts a state of the table 302 where the redundant key-value pair "K0001-0001" has been deleted in view of the new key-value pair "K0001_1-0001".

Figure 3B:
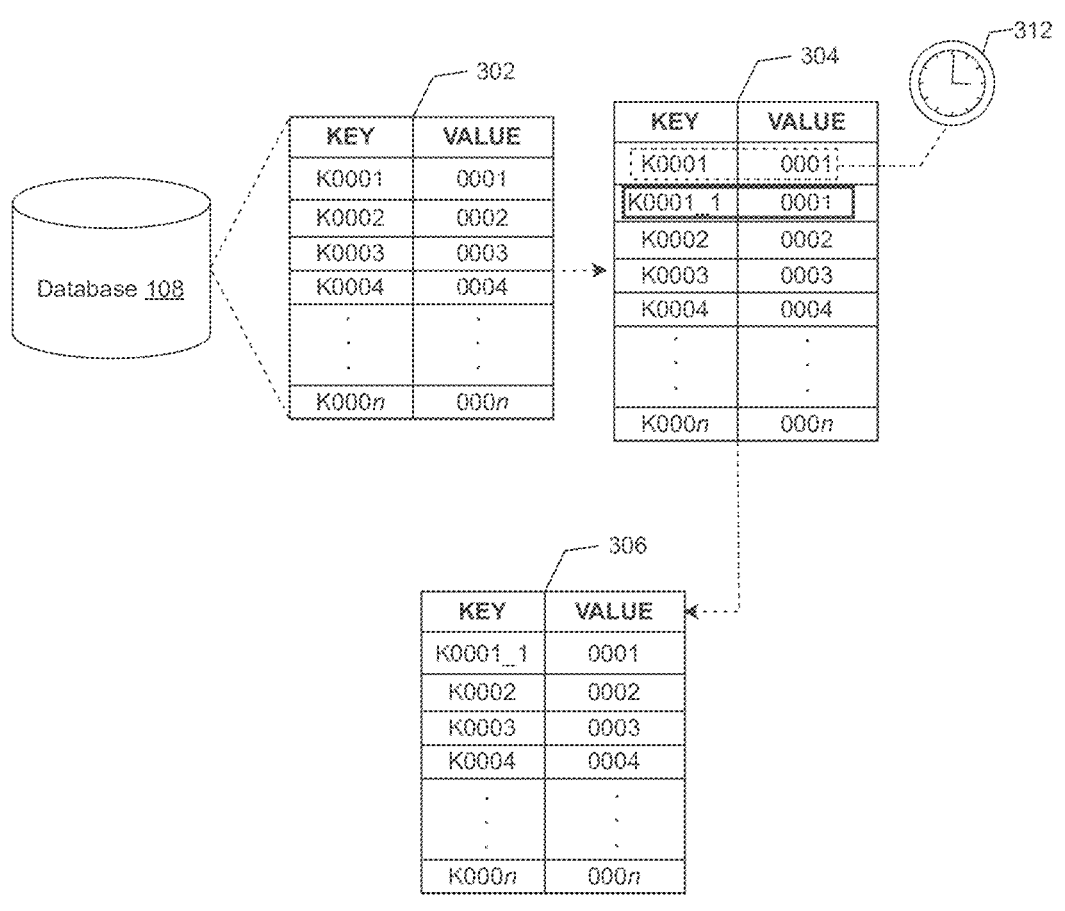
FIG. 3B illustrates yet another use case depicting operations of the system for the automatic clean-up of redundant key-value pair in a database, according to one or more embodiments of the present disclosure.

FIG. 3B illustrates another use case 300-2 depicting operations of the system 102 for the automatic clean-up of redundant key-value pair in the database 108, according to one or more embodiments of the present disclosure. The use case 300-2 depicts a scenario where the redundant key-value pair "K0001-0001" has a deletion operation schedule 312 and rest of the previous steps are similar to the use case 300-1 as explained in above paragraphs. Now, once the processing unit 202 deems the key-value pair "K0001-0001" in the table 304 as redundant key-value pair, the processing unit 202 may verify whether one or more conditions are set for the at least one redundant key-value pair i.e., the key-value pair "K0001-0001".

According to use case 300-2, the processing unit 202 may determine that the redundant key-value pair "K0001-0001" has the deletion operation schedule 312. In a non-limiting aspect, the deletion operation schedule 312 may define a time at which the redundant key-value pair "K0001-0001" is to be deleted. Once the processing unit 202 verifies presence of the deletion operation schedule 312 for the redundant key-value pair "K0001-0001", the processing unit 202 may refrain from deleting the redundant key-value pair "K0001-0001" until expiry of the time as per the deletion operation schedule 312. In some non-limiting examples, the deletion operation schedule 312 may be set so that any ongoing process or a planned upcoming process having a known execution period does not get adversely affected because of sudden data removal. This may ensure safe data removal from the database 108.

Further, once the processing unit 202 determines that the time as per the deletion operation schedule 312 has until expired, the processing unit 202 may flag the redundant key-value pair "K0001-0001" for deletion. In an aspect, the flagging of the redundant key-value pair for deletion may indicate that the redundant key-value pair may now be removed/deleted from the database 108 without any adverse impact on any process dependent on the redundant key-value pair. Finally, the processing unit 202 may perform deletion of the redundant key-value pair "K0001-0001" from the database 108. The table 306 of the use case 300-1 depicts a state of the table 302 where the redundant key-value pair "K0001-0001" has been deleted in view of the new key-value pair "K0001_1-0001".

FIG. 4 illustrates a flowchart of a method 400 for automatic clean-up of redundant key-value pairs in the database 108, according to one or more embodiments of the present disclosure. The steps of the method 400, described in connection with the embodiments disclosed herein, may be embodied directly in hardware, in firmware, in a software module executed by the system 102, or in any practical combination thereof.

At step 402, the method 400 may perform detection of the new key-value pair in the database 108. In an aspect, the new key-value pair may comprise a renamed key field or a new key field and a value field i.e., the method 400 may detect an addition of one or more new key-value pairs and/or modification of the key field and/or the value field of the existing one or more key-value pairs, etc. In an aspect, in case of modification of the existing one or more key-value pairs, the user 106 may rename a key field while keeping the value field unchanged. In another aspect, the user 106 may rename a key field and change the value field as well. may perform detection of the new key-value pair in real-time i.e., as soon as the new key-value pair is introduced in the database 108

In an aspect, the method 400 may perform detection of the new key-value pair in the database 108 in real-time i.e., as soon as the new key-value pair is introduced in the database 108. In another aspect, the method 400 may perform detection of the new key-value pair in the database 108 during a periodic scan of the database 108. In an aspect, the periodic scan of the database 108 may be a pre-configured process of scanning the database 108 periodically after a predefined time interval. In a non-limiting example, the periodic scan of the database 108 may be a pre-configured or scheduled after every 30 minutes, 1 hour, twice in a day, thrice in a day, etc. or at any other predefined time-interval as per the implementation requirement. In a non-limiting embodiment, the processing unit 202 may perform the step 402 of the method 400.

At step 404, the method 400 may identify at least one redundant key-value pair in the plurality of key-value pairs of the database 108 based on determining a similarity between the value field of the new key-value pair and a value field of at least one key-value pair in the plurality of key-value pairs. In a non-limiting embodiment, the processing unit 202 may perform the step 404 of the method 400.

At step 406, the method 400 may verify whether one or more conditions are set for the at least one redundant key-value pair. In an aspect, the one or more conditions may comprise at least one of: (a) at least one association of the at least one redundant key-value pair with at least one ongoing process, and (b) a deletion operation schedule for the at least one redundant key-value pair.

In another aspect, the method 400 may verify the one more conditions for the at least one redundant key-value pair by verifying whether the at least one redundant key-value pair is being accessed by the at least one ongoing process. Further, the method 400 may flag the at least one redundant key-value pair for deletion, when it is verified that the at least one redundant key-value pair is not being accessed by the at least one ongoing process.

In yet another aspect, the method 400 may verify the one more conditions for the at least one redundant key-value pair by verifying whether the at least one redundant key-value pair is being accessed by the at least one ongoing process. Further, the method 400 may flag the at least one redundant key-value pair for deletion upon completion of the at least one ongoing process, when it is verified that the at least one redundant key-value pair is being accessed by the at least one ongoing process.

In yet another aspect, the method 400 may verify the one more conditions for the at least one redundant key-value pair by determining whether the at least one redundant key-value pair has a deletion operation scheduled or not, wherein the deletion operation schedule may define a time at which the at least one redundant key-value pair is to be deleted. Further, the method 400 may flag the at least one redundant key-value pair for deletion as per the deletion operation schedule. In a non-limiting embodiment, the processing unit 202 may perform the step 406 of the method 400.

At step 408, the method 400 may perform deletion of the identified at least one redundant key-value pair from the database 108, upon verification of the one or more conditions. In an aspect, when a plurality of redundant key-value pairs are identified in the plurality of key-value pairs in the database 108, the method 400 may perform concurrent deletion of the plurality of identified redundant key-value pairs. In a non-limiting embodiment, the processing unit 202 may perform the step 408 of the method 400.

Figure 5:
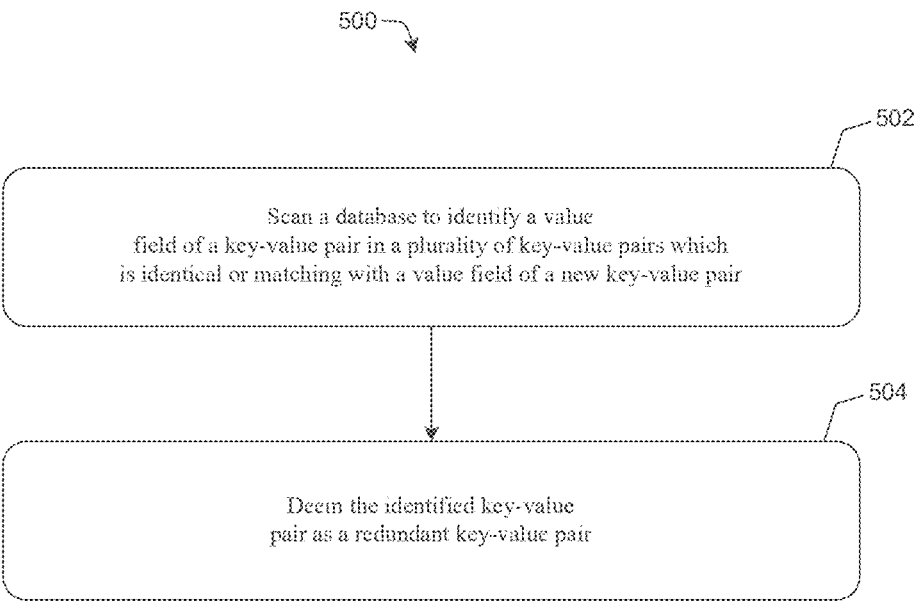
FIG. 5 illustrates a flowchart of a method of identifying the redundant key-value pairs, according to one or more embodiments of the present disclosure.

FIG. 5 illustrates a flowchart of a method 500 of identifying the redundant key-value pairs, according to one or more embodiments of the present disclosure. The steps of the method 500, described in connection with the embodiments disclosed herein, may be embodied directly in hardware, in firmware, in a software module executed by the system 102, or in any practical combination thereof.

At step 502, the method 500 may scanning the database to identify the value field of the at least one key-value pair in the plurality of key-value pairs which is (a) identical to the value field of the new key-value pair, or (b) matching the value field of the new key-value pair by a predefined percentage, to determine that the value field of the new key-value pair and the value field of the at least one key-value pair in the plurality of key-value pairs are similar.

In an aspect, to determine if any other value field is similar to the value field of the new key-value field, the method 500 may scan the database 108 to identify any other value field in the plurality of key-value pairs pre-existing in the database 108 which is identical to the value field of the new key-value pair. The method 500 may identify any other value field as identical to the value field of the new key-value pair which perfectly match the content of the value field of the new key-value pair with any other value field of the plurality of key-value pairs pre-existing in the database 108 i.e., the value field of the new key-value field has 100% match with another value field already existing in the database 108.

In another aspect, the method 500, while scanning the database 108, the method 500 may not find any value field in the pre-existing key-value pairs which is perfectly matching (i.e., identical) to the value field of the new key-value pair. In this situation, the method 500 may perform identification of any value field which may be similar to the value field of the new key-value pair by a predefined percentage. The predefined percentage may be hardcoded/pre-configured by the developers or engineers or an administrator of the system 102. In an example, the predefined percentage may also be changed after the system 102 is implemented.

In an non-limiting example, the predefined percentage may be set to 90% i.e., if the method 500, while scanning the database 108, identifies a value field in the pre-existing key-value pairs of the database 108 which is matching with the value field of the new key-value pair by at least 90%, the method 500 may identify such a key-value pair containing the value matching or similar by at least 90% with the new key-value pair as a redundant key-value pair. Similarly, the predefined percentage may be set as 80%, 85%, 95%, 99% or any other number as per the implementation requirement. In another example, the predefined percentage may be set as a range, for example, 80-90%, 90-99% or any other range as per the implementation requirement.

At step 504, the method 500 may deem the identified at least one key-value pair as the at least one redundant key-value pair. In an aspect, the method 500, upon identifying at least one identical value field in the plurality of key-value pairs pre-existing in the database 108, may deem the key-value pair containing the identified value field which is identical to the value field of the new key-value pair as a redundant key-value pair in view of the new key-value pair. Similarly, in another aspect, the method 500 may identify more than one identical value fields in the plurality of key-value pairs pre-existing in the database 108. In this case, the method 500 may deem all such key-value pairs in the plurality of key-value pairs pre-existing in the database 108 as redundant key-value pairs. In a non-limiting embodiment, the processing unit 202 may perform the steps 502 and 504 of the method 500.

Figure 6:
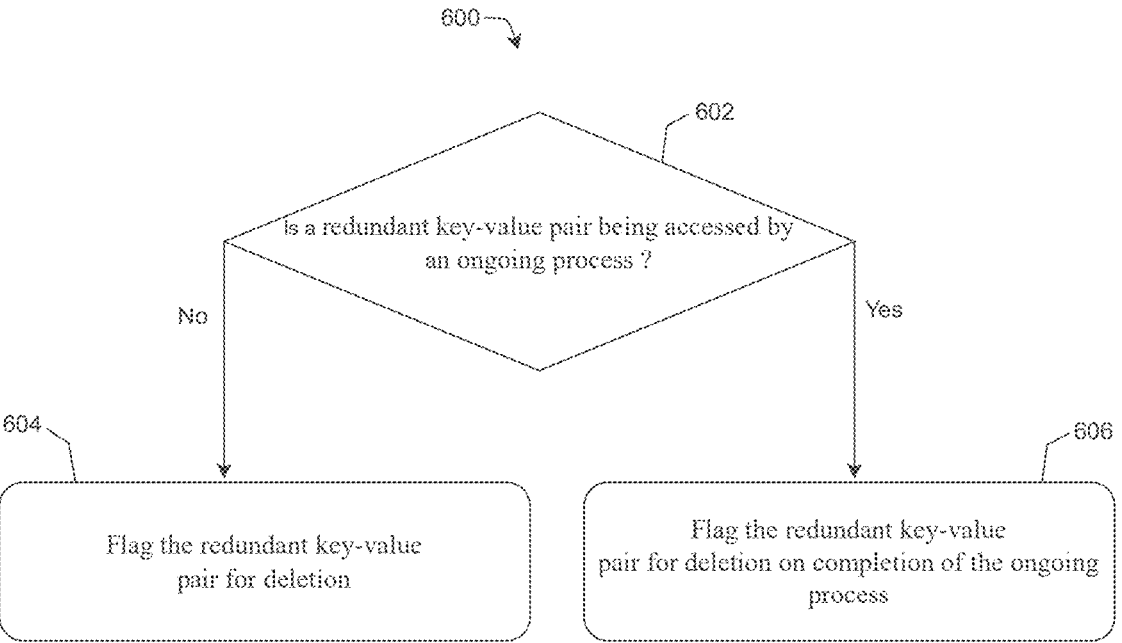
FIG. 6 illustrates a flowchart of a method of verifying one or more conditions for the redundant key-value pairs, according to one or more embodiments of the present disclosure.

FIG. 6 illustrates a flowchart of a method 600 of verifying the one more conditions for the redundant key-value pairs, according to one or more embodiments of the present disclosure. The steps of the method 600, described in connection with the embodiments disclosed herein, may be embodied directly in hardware, in firmware, in a software module executed by the system 102, or in any practical combination thereof.

At step 602, the method 600 may verify whether the at least one redundant key-value pair is being accessed by at least one ongoing process or not i.e., at least one association of the at least one redundant key-value pair with at least one ongoing process. In a non-limiting example, the at least one ongoing process may be an execution of one or more programs or codes which may be accessing data associated with the identified at least one redundant key-value pair.

At 604, the method 600 may flag the at least one redundant key-value pair for deletion from the database 108, when it is verified that the at least one redundant key-value pair is not being accessed by the at least one ongoing process.

At 606, the method 600 may flag the at least one redundant key-value pair for deletion upon completion of the at least one ongoing process, when it is verified that the at least one redundant key-value pair is being accessed by the at least one ongoing process. This may ensure safe data removal from the database 108 without jeopardizing execution of any ongoing process. In a non-limiting embodiment, the processing unit 202 may perform the steps 602-606 of the method 600.

Figure 7:
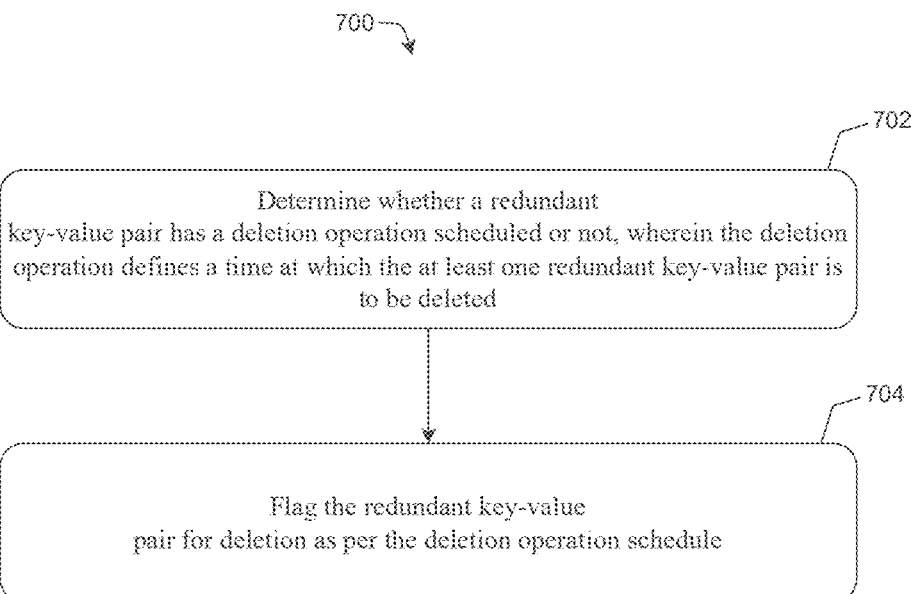
FIG. 7 illustrates a flowchart of a method of verifying one or more conditions related to scheduled deletion of the redundant key-value pairs, according to one or more embodiments of the present disclosure.

FIG. 7 illustrates a flowchart of a method 700 of verifying one or more conditions related to scheduled deletion of the redundant key-value pairs, according to one or more embodiments of the present disclosure. The steps of the method 700, described in connection with the embodiments disclosed herein, may be embodied directly in hardware, in firmware, in a software module executed by the system 102, or in any practical combination thereof.

At step 702, the method 700 may determine whether the at least one redundant key-value pair has a deletion operation scheduled or not, wherein the deletion operation schedule defines a time at which the at least one redundant key-value pair is to be deleted.

In an aspect, before performing the deletion of the identified at least one redundant key-value pair, the method 700 may determine whether the identified at least one redundant key-value pair has a deletion operation scheduled or not. Determining the presence of the deletion operation schedule for the identified at least one redundant key-value pair may be performed to ensure safe data removal. In an example, in a scenario where an ongoing process is currently accessing the identified at least one redundant key-value pair and the ongoing process is scheduled to continue for a predetermined or known period, the method 700 may set a status of the identified at least one redundant key-value pair as 'deletion operation scheduled'. Further, the method 700 may determine the predetermined or known period for which the ongoing process is set to continue.

Further, the method 700 may determine the presence of the deletion operation schedule for the identified at least one redundant key-value pair to handle a scenario where a process is set to access the identified at least one redundant key-value pair in due course i.e., an upcoming planned process and the process is scheduled to continue for a predetermined or known period. In this scenario, the method 700 may set the status of the identified at least one redundant key-value pair as deletion operation scheduled.

At step 704, the method 700 may flag the identified at least one redundant key-value pair for deletion as per the deletion operation schedule. In an aspect, when the method 700 may only flag the identified at least one redundant key-value pair for deletion after the pre-determined or known period for which the ongoing process is set to continue is over.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above. The term "computer readable medium" may include any medium that is capable of storing, encoding, or carrying instructions for execution by the system 102 and that cause the system 102 to perform any one or more of the techniques of the present disclosure, or that is capable of storing, encoding or carrying data structures used by or associated with such instructions. Non-limiting computer readable medium examples may include solid-state memories, and optical and magnetic media. In an example, a massed computer readable medium comprises a computer readable medium with a plurality of particles having invariant (e.g., rest) mass. Accordingly, massed computer-readable media are not transitory propagating signals. Specific examples of massed machine readable media may include: non-volatile memory, such as semiconductor memory devices (e.g., Electrically Programmable Read-Only Memory (EPROM). Electrically Erasable Programmable Read-Only Memory (EEPROM)) and flash memory devices; magnetic disks, such as internal hard disks and removable disks; magneto-optical disks; and CD-ROM and DVD-ROM disks.

The connecting lines shown in the various figures contained herein are intended to represent exemplary functional relationships and/or physical couplings between the various elements. It should be noted that many alternative or additional functional relationships or physical connections may be present in an embodiment of the subject matter.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method for automatic clean-up of redundant key-value pairs in a database comprising a plurality of key-value pairs, the method comprising:
   detecting a new key-value pair in the database, wherein the new key-value pair comprises: a renamed key field or a new key field and a value field;
   identifying at least one redundant key-value pair in the plurality of key-value pairs of the database based on determining a similarity between the value field of the new key-value pair and a value field of at least one key-value pair in the plurality of key-value pairs;
   performing one or more verification operations based on the at least one redundant key-value pair and one or more conditions, wherein the one or more conditions comprise at least one of: (a) at least one association of the at least one redundant key-value pair with at least one ongoing process, and (b) a deletion operation schedule for the at least one redundant key-value pair, wherein the at least one ongoing process comprises a computer program currently executing, and wherein performing the one or more verification operations comprises monitoring the executing of the computer program; and
   performing deletion of the at least one redundant key-value pair from the database based at least in part on output of the one or more verification operations indicating the at least one redundant key-value pair is free of association with the computer program.

2. The method of claim 1, wherein the detecting of the new key-value pair is performed in at least one of: (a) real time; or (b) a periodic scan of the database.

3. The method of claim 1, wherein the identifying of the at least one redundant key-value pair, comprising:
   scanning the database to identify the value field of the at least one key-value pair in the plurality of key-value pairs which is (a) identical to the value field of the new key-value pair, or (b) matching the value field of the new key-value pair by a predefined percentage, to determine that the value field of the new key-value pair and the value field of the at least one key-value pair in the plurality of key-value pairs are similar;
   deeming the identified at least one key-value pair as the at least one redundant key-value pair.

4. The method of claim 1, further comprising:
   flagging the at least one redundant key-value pair for deletion, when it is verified that the at least one redundant key-value pair is not being accessed by the at least one ongoing process.

5. The method of claim 1, further comprising:
   flagging the at least one redundant key-value pair for deletion upon completion of the at least one ongoing process, when it is verified that the at least one redundant key-value pair is being accessed by the at least one ongoing process.

6. The method of claim 1, further comprising:
   determining the at least one redundant key-value pair has a deletion operation scheduled, wherein the deletion operation schedule defines a time at which the at least one redundant key-value pair is to be deleted, and
   flagging the at least one redundant key-value pair for deletion as per the deletion operation schedule.

7. The method of claim 1, wherein the identifying comprises identifying a plurality of redundant key-value pairs in the plurality of key-value pairs in the database, wherein the performing of the deletion, further comprising:

performing concurrent deletion of the plurality of redundant key-value pairs.

8. A system for automatic clean-up of redundant key-value pairs in a database comprising a plurality of key-value pairs, the system comprising:

a memory;

a processing unit communicatively coupled to the memory and the database, the processing unit is configured to:

detect a new key-value pair in the database, wherein the new key-value pair comprises: a renamed key field or a new key field and a value field;

identify at least one redundant key-value pair in the plurality of key-value pairs of the database based on determining a similarity between the value field of the new key-value pair and a value field of at least one key-value pair in the plurality of key-value pairs;

perform one or more verification operations based on the at least one redundant key-value pair and one or more conditions, wherein the one or more conditions comprise at least one of: (a) at least one association of the at least one redundant key-value pair with at least one ongoing process, and (b) a deletion operation schedule for the at least one redundant key-value pair, wherein the at least one ongoing process comprises a computer program currently executing, and wherein performing the one or more verification operations comprises monitoring the executing of the computer program; and perform deletion of the at least one redundant key-value pair from the database based at least in part on output of the one or more verification operations indicating the at least one redundant key-value pair is free of association with the computer program.

9. The system of claim 8, wherein the processing unit is configured to perform detection of the new key-value pair in at least one of: (a) real time; or (b) a periodic scan of the database.

10. The system of claim 8, wherein to identify the at least one redundant key-value pair, the processing unit is configured to:

scan the database to identify the value field of the at least one key-value pair in the plurality of key-value pairs which is (a) identical to the value field of the new key-value pair, or (b) matching the value field of the new key-value pair by a predefined percentage, to determine that the value field of the new key-value pair and the value field of the at least one key-value pair in the plurality of key-value pairs are similar;

deem the identified at least one key-value pair as the at least one redundant key-value pair.

11. The system of claim 8, wherein the processing unit is further configured to:

flag the at least one redundant key-value pair for deletion, when it is verified that the at least one redundant key-value pair is not being accessed by the at least one ongoing process.

12. The system of claim 8, wherein the processing unit is further configured to:

verify the at least one redundant key-value pair is being accessed by the at least one ongoing process; and flag the at least one redundant key-value pair for deletion upon completion of the at least one ongoing process, when it is verified that the at least one redundant key-value pair is being accessed by the at least one ongoing process.

13. The system of claim 8, wherein the processing unit is further configured to:

determine the at least one redundant key-value pair has a deletion operation scheduled, wherein the deletion operation schedule defines a time at which the at least one redundant key-value pair is to be deleted; and flag the at least one redundant key-value pair for deletion as per the deletion operation schedule.

14. The system of claim 8, wherein the processing unit identifies a plurality of redundant key-value pairs in the plurality of key-value pairs in the database, to perform the deletion, the processing unit is further configured to:

perform concurrent deletion of the plurality of redundant key-value pairs.

15. A computer-readable medium having computer-executable instructions stored thereon that, when executed by a processing unit, cause the processing unit to execute a method for automatic clean-up of redundant key-value pairs in a database comprising a plurality of key-value pairs, wherein the processing unit is configured to:

detect a new key-value pair in the database, wherein the new key-value pair comprises: a renamed key field or a new key field and a value field;

identify at least one redundant key-value pair in the plurality of key-value pairs of the database based on determining a similarity between the value field of the new key-value pair and a value field of at least one key-value pair in the plurality of key-value pairs;

perform one or more verification operations based on the at least one redundant key-value pair and one or more conditions, wherein the one or more conditions comprise at least one of: (a) at least one association of the at least one redundant key-value pair with at least one ongoing process, and (b) a deletion operation schedule for the at least one redundant key-value pair, wherein the at least one ongoing process comprises a computer program currently executing, and wherein performing the one or more verification operations comprises monitoring the executing of the computer program; and perform deletion of the at least one redundant key-value pair from the database based at least in part on output of the one or more verification operations indicating the at least one redundant key-value pair is free of association with the computer program.

16. The computer-readable medium of claim 15, wherein the computer-executable instructions cause the processing unit to:

perform detection of the new key-value pair in at least one of: (a) real time; or (b) a periodic scan of the database.

17. The computer-readable medium of claim 15, wherein to identify the at least one redundant key-value pair, the computer-executable instructions cause the processing unit to:

scan the database to identify the value field of the at least one key-value pair in the plurality of key-value pairs which is (a) identical to the value field of the new key-value pair, or (b) matching the value field of the new key-value pair by a predefined percentage, to determine that the value field of the new key-value pair and the value field of the at least one key-value pair in the plurality of key-value pairs are similar;

deem the identified at least one key-value pair as the at least one redundant key-value pair.

18. The computer-readable medium of claim 15, wherein the computer-executable instructions cause the processing unit to:

flag the at least one redundant key-value pair for deletion, when it is verified that the at least one redundant key-value pair is not being accessed by the at least one ongoing process.

19. The computer-readable medium of claim 15, wherein the computer-executable instructions cause the processing unit to:

verify the at least one redundant key-value pair is being accessed by the at least one ongoing process; and flag the at least one redundant key-value pair for deletion upon completion of the at least one ongoing process, when it is verified that the at least one redundant key-value pair is being accessed by the at least one ongoing process; or determine the at least one redundant key-value pair has a deletion operation scheduled, wherein the deletion operation schedule defines a time at which the at least one redundant key-value pair is to be deleted; and flag the at least one redundant key-value pair for deletion as per the deletion operation schedule.

20. The computer-readable medium of claim 15, wherein the processing unit identifies a plurality of redundant key-value pairs in the plurality of key-value pairs in the database, to perform the deletion, the computer-executable instructions cause the processing unit to:

perform concurrent deletion of the plurality of redundant key-value pairs.

* * * * *

26